United States Patent
Shida et al.

[11] Patent Number: 5,929,178
[45] Date of Patent: Jul. 27, 1999

[54] HEAT-AGING-RESISTANT POLYAMIDE RESIN COMPOSITION AND FIBER COMPRISING THE SAME

[75] Inventors: Takatoshi Shida; Makoto Takahashi; Masahiro Harada, all of Kanagawa-ken, Japan

[73] Assignee: Mitsubishi Gas Chemical Company, Inc., Tokyo, Japan

[21] Appl. No.: 08/946,442

[22] Filed: Oct. 7, 1997

[30] Foreign Application Priority Data

Nov. 1, 1996 [JP] Japan ................................. 8-291377

[51] Int. Cl.$^6$ ............................. C08L 67/00; C08L 77/00
[52] U.S. Cl. ..................... 525/419; 525/432; 528/310; 528/322; 524/504; 524/600; 524/603; 524/606; 524/700; 524/710; 524/711; 428/357; 428/394; 428/395
[58] Field of Search ................................ 524/606, 700, 524/600, 603, 504, 711, 710; 525/419, 432; 428/357, 394, 395; 528/310, 322

[56] References Cited

U.S. PATENT DOCUMENTS

| | | | |
|---|---|---|---|
| 2,705,227 | 3/1955 | Stamatoff | 523/307 |
| 3,565,910 | 2/1971 | Elbert et al. | 355/77 |
| 3,573,245 | 3/1971 | Mueller et al. | 524/239 |
| 3,691,131 | 9/1972 | Kelmchuk | 524/100 |
| 3,787,355 | 1/1974 | Linhart et al. | 524/100 |
| 3,929,725 | 12/1975 | Davis | 524/711 |
| 5,256,718 | 10/1993 | Yamamoto et al. | 524/411 |
| 5,541,267 | 7/1996 | Akkapeddi et al. | 525/432 |
| 5,763,517 | 6/1998 | Yamamoto et al. | 524/302 |

FOREIGN PATENT DOCUMENTS

| | | |
|---|---|---|
| 0 424 556 A1 | 5/1991 | European Pat. Off. . |
| 38-22720 | 10/1963 | Japan . |
| 652048 | 5/1951 | United Kingdom . |
| 839067 | 6/1960 | United Kingdom . |

*Primary Examiner*—P. Hampton-Hightower
*Attorney, Agent, or Firm*—Frishauf, Holtz, Goodman, Langer & Chick, P.C.

[57] ABSTRACT

There are provided a heat-aging-resistant polyamide resin composition comprising (C) a polyamide containing 10 to 100% by weight of (A) a polyamide obtained by polymerizing a monomer containing 70 mole % or more of m-xylylenediamine as a diamine component and a monomer containing 70 mole % or more of adipic acid as a dicarboxylic acid component and 90 to 0% by weight of (B) other polyamide, (D) a copper compound in an amount of 0.001 to 0.1 part by weight per 100 parts by weight of the polyamide (C), (E) a halide of a Group 1 or Group 2 metal of the Periodic Table of the Elements, an ammonium halide, or an organohalide in an amount of 0.005 to 1 part by weight per 100 parts by weight of the polyamide (C), at least one selected from among (F) hindered phenols and (G) hindered amines with the amount of each of the hindered phenols (F) and the hindered amines (G) being 0.05 to 3 parts by weight per 100 parts by weight of the polyamide (C), and (H) an organophosphorus compound in an amount of 0.05 to 3 parts by weight per 100 parts by weight of the polyamide (C), and a high-Young's modulus heat-aging-resistant polyamide fiber comprising said polyamide resin composition and having a Young's modulus of 400 kgf/mm$^2$ or more which has an excellent durability, such as a heat-aging-resistance under high-temperature conditions.

12 Claims, No Drawings

HEAT-AGING-RESISTANT POLYAMIDE RESIN COMPOSITION AND FIBER COMPRISING THE SAME

BACKGROUND OF THE INVENTION

1. Field of the Invention

The present invention relates to a polyamide fiber, and particularly to a high-Young's modulus polyamide fiber having an excellent durability under high-temperature conditions.

2. Description of the Related Arts

Polyamides have such chemical and mechanical properties as a high strength, an abrasion resistance, a fatigue resistance, and a good dyeability so that they can be used as injection molding materials for housings or the like for appliances and computers and as industrial materials and materials for leisure goods, for example, for threads, clothing including textile fabrics, tire cords, fishing nets, canvas, filter fabric for papermaking, and tennis-racket strings, or can be used for food packaging films or for sheets for a variety of containers. Particularly, since polyamides obtained from xylylenediamine and aliphatic dicarboxylic acids and containing amide linkage repeating units, which are called polyamide MXD6, have a high Young's modulus and a low water absorption and are excellent in hydrolytic resistance in comparison with polyamide 6 with polyamide 66 and the like, they are particularly useful as the foregoing industrial materials, for example, for door mirror stays, tire cords, and filter fabric for papermaking. However, polyamides have defects that the mechanical strength is lowered in an atmosphere having a high temperature, particularly in the presence of oxygen, where lamp reflectors, tire cords, filter fabric for papermaking, and the like are actually used, and that the coloring is extremely facilitated in such an atmosphere, and polyamide MXD6 cannot be free from these defects also.

To protect polyamide products from deterioration due to thermal oxidation, conventionally, a variety of methods wherein copper compounds are mainly used has been suggested. Specifically, a method wherein a copper salt is added is described in British Patent No. 652,947. Nevertheless, the method is accompanied by a defect that the polyamide is colored reddish brown or a deposit insoluble in the polyamide separates when the polyamide containing such a copper salt is melted and molded. To overcome the defect, there are suggested, for example, a method disclosed in British Patent No. 839,067 wherein a copper compound is used together with an organic or inorganic halide with a method wherein a copper compound is used in combination with a phenolic age-resister or an aromatic amine age-resister with and a method disclosed in Japanese Patent Publication No. 22720/1963 wherein a copper compound is used in combination with a sulfur compound, such as 2-mercaptobenzimidazole. However, when polyamides, such as the above polyamide MXD6, are used, even these stabilizers have such problems that the coloring is facilitated extremely and the ability for heat stabilization is not exhibited satisfactorily. Thus, satisfactory stabilizers that solve all the above problems have not yet been found. Particularly in the field of industrial materials for tire cords, filter fabric for papermaking, and the like, the development of materials excellent in heat aging characteristics without impairing such advantages as a high strength, a high Young's modulus, and an excellent hydrolysis resistance is desired.

SUMMARY OF THE INVENTION

The present invention provides a high-Young's modulus polyamide fiber having an excellent durability, such as heat aging characteristics, under conditions having a high temperature.

The inventors of the present invention have investigated intensively and have found that the above problems can be solved by using, as a material for a polyamide fiber, a polyamide resin composition obtained by combining a polyamide resin containing a polyamide with a specified structure in a certain amount or more with several specified heat-aging-resisters, leading to the completion of the present invention.

Specifically, the present invention relates to a heat-aging-resistant polyamide resin composition comprising (C) a polyamide containing 10 to 100% by weight of (A) a polyamide obtained by polymerizing a monomer containing 70 mole % or more of m-xylylenediamine as a diamine component and a monomer containing 70 mole % or more of adipic acid as a dicarboxylic acid component and 90 to 0% by weight of (B) other polyamide, (D) a copper compound in an amount of 0.001 to 0.1 part by weight per 100 parts by weight of the polyamide (C), (E) a halide of a Group 1 or Group 2 metal of the Periodic Table of the Elements, an ammonium halide, or an organohalide in an amount of 0.005 to 1 part by weight per 100 parts by weight of the polyamide (C), at least one selected from among (F) hindered phenols and (G) hindered amines with the amount of each of the hindered phenols (F) and the hindered amines (G) being 0.05 to 3 parts by weight per 100 parts by weight of the polyamide (C), and (H) an organophosphorus compound in an amount of 0.05 to 3 parts by weight per 100 parts by weight of the polyamide (C), and a high-Young's modulus heat-aging-resistant polyamide fiber comprising said resin composition and having a Young's modulus of 400 kgf/mm$^2$ or more.

DESCRIPTION OF THE PREFERRED EMBODIMENTS

The polyamide (A) used in the present invention refers to a polyamide obtained by polycondensation of a raw material containing m-xylylenediamine amounting to 70 mole % in the raw diamine and adipic acid amounting 70 mole % in the raw dicarboxylic acid. By way of example, as diamines other than m-xylylenediamine, aliphatic diamines, such as tetramethylenediamine, pentamethylenediamine, hexamethylenediamine, octamethylenediamine, and nonamethylenediamine, aromatic diamines, such as p-xylylenediamine and p-phenylenediamine, and alicyclic diamines, such as 1,3-bisaminomethylcyclohexane and 1,4-bisaminomethylcyclohexane can be used in an amount of less than 30 mole % in all the diamine components. Further, as dicarboxylic acids other than adipic acid, aliphatic dicarboxylic acids, such as succinic acid, glutaric acid, pimelic acid, suberic acid, azelaic acid, sebacic acid, undecanedioic acid, and dodecanedioic acid, and aromatic dicarboxylic acids, such as terephthalic acid, isophthalic acid, and 2,6-naphthalenedicarboxylic acid can be used in an amount of less than 30 mole % in all the dicarboxylic acid components.

When the polyamide (A) is a polyamide obtained by polymerizing a monomer containing m-xylylenediamine as a diamine component and adipic acid as a dicarboxylic acid component with the amount of one of them being less than 70 mole %, the finally obtainable fiber lacks in such properties as hydrolysis resistance, high tenacity, and high Young's modulus.

The polyamide (C) used in the present invention may contain other polyamides (B) in amount of 90 to 0% by weight. As other polyamides (B), various polyamides, can be mentioned, such as a polymer of ε-caprolactam, aminocaproic acid, enantholactam, 7-aminoheptanoic acid, 11-aminoundecanoic acid, 9-aminononanoic acid, α-pyrrolidone, or the like, a polymer obtained by polymerizing a diamine, such as hexamethylenediamine, nonamethylenediamine, and undecamethylenediamine with a dicarboxylic acid, such as terephthalic acid, isophthalic acid, adipic acid, sebacic acid, dodecanedioic acid, and glutaric acid, or a copolymer obtained from these. Examples of these are polyamide 4, polyamide 6, polyamide 7, polyamide 8, polyamide 11, polyamide 12, polyamide 66, polyamide 69, polyamide 610, polyamide 611, polyamide 612, polyamide 6T (which represents a polyamide obtained from hexamethylenediamine and terephthalic acid), polyamide 66/6, polyamide 6/12, polyamide 6/6T, and polyamide 66/6T. It is required that the polyamide (A) in the polyamide resin composition of the present invention be 10% by weight or more. If the proportion of the polyamide (A) is less than 10% by weight, the exhibition of the properties possessed by the polyamide (A), e.g., the high tenacity and the high Young's modulus, cannot be recognized satisfactorily in the obtainable fiber.

The Young's modulus of the polyamide fiber of the present invention is 400 kgf/mm$^2$ or more, and preferably 500 kgf/mm$^2$ or more. If the Young's modulus is less than 400 kgf/mm$^2$, the filter fabric for papermaking, the industrial woven fabric or nonwoven fabric for industrial filters, or the tire cords obtained from the polyamide fiber of the present invention are deformed when used and their commercial value is lost.

The copper compound (D) used in the present invention includes various copper salts of inorganic or organic acids. Preferable examples are copper chloride, copper bromide, copper iodide, copper phosphate, and copper stearate. The amount thereof to be added is 0.001 to 0.1 part by weight, and preferably 0.005 to 0.05 part by weight, per 100 parts by weight of the polyamide (C) of the present invention. If the amount is less than 0.001 part by weight, the effect of improving heat-aging resistance is not satisfactory while if the amount is over 0.1 part by weight, problems of the deposition of copper and coloring take place.

As the halide of a Group 1 or Group 2 metal of the Periodic Table of the Elements, the ammonium halide, or the organohalide used as the component (E) in the present invention, for example, sodium bromide, sodium iodide, potassium bromide, potassium iodide, calcium chloride, ammonium iodide, stearyltriethylammonium bromide, and benzyltriethylammonium iodide are preferable. The amount of these to be added is 0.005 to 1 part by weight, and preferably 0.01 to 0.8 part by weight, per 100 parts by weight of the polyamide (C). If the amount is less than 0.005 part by weight, the effect of the copper compound of assisting the heat-aging resistance improving effect for the polyamide (C) becomes poor while if the amount is over 1 part by weight, the effect is not further increased and the productivity is hampered.

As the hindered phenols (F) used in the present invention, for example, pentaerythrityl-tetrakis[3-(3,5-di-t-butyl-4-hydroxyphenyl)propionate], N,N'-hexamethylenebis(3,5-di-t-butyl-4-hydroxy-hydrocinnamamide), and 3,5-di-t-butyl-4-hydroxy-benzylphosphonate diethyl ester can be mentioned. The amount of these to be added is 0.05 to 3 parts by weight, and preferably 0.1 to 2 parts by weight, per 100 parts by weight of the polyamide (C) of the present invention. If the amount is less than 0.05 part by weight, the effect of improving heat-aging resistance is not satisfactory while if the amount is over 3 parts by weight, the effect is not increased further and the increased amount causes the stability at the time of melting and extruding to be hampered.

As the hindered amines (G) used in the present invention, for example, bis(2,2,6,6-tetramethyl-4-piperidyl) sebacate, bis(1,2,2,6,6-pentaethyl-4-piperidinyl) sebacate, and 2-(3,5-di-t-butyl-4-hydroxybenzyl)-2-n-butyl malonate bis(1,2,2,6,6-pentamethyl-4-piperidyl) can be mentioned. The amount of these to be added is 0.05 to 3 parts by weight, and preferably 0.1 to 2 parts by weight, per 100 parts by weight of the polyamide. If the amount is less than 0.05 part by weight, the effect of preventing heat aging for the polyamide (C) is not satisfactory while if the amount is over 3 parts by weight, the effect of preventing heat aging is not increased further and the increased amount causes the stability at the time of melting and extruding to be hampered.

As the organophosphorus compound (H) used in the present invention, a variety of alkylally phosphites and triallyl phosphites can be mentioned. Specific examples are bis(2,6-di-t-butyl-4-methylphenyl)pentaerythritol diphosphite, bis(2,4-di-t-butylphenyl)pentaerythritol diphosphite, bis(octadecyl)pentaerythritol diphosphite, and bis(nonylphenyl)pentaerythritol diphosphite. The amount of these to be added is 0.05 to 3 parts by weight, and preferably 0.1 to 2 parts by weight per 100 parts by weight of the polyamide (C). If the amount is less than 0.05 part by weight, the effect of improving heat-aging resistance for the polyamide (C) is not satisfactory while if the amount is over 3 parts by weight, the effect is not further increased and the increased amount causes the stability at the time of melting and extruding to be hampered.

The copper compound (D), the halide of a Group 1 or Group 2 metal of the Periodic Table of the Elements, the ammonium halide, or the organohalide (E), the hindered phenols (F), the hindered amines (G), and the organophosphorus compound (H) used in the present invention may be used as any combination of (D)/(E)/(F)/(H), (D)/(E)/(G)/(H) or (D)/(E)/(F)/(G)/(H) in combination with the polyamide (C). Particularly, when a combination of four components is used, if only one of the components in the above combination is not added, the satisfactory effect of improving heat-aging resistance is not recognized.

The term "effect of improving heat-aging resistance" in the present invention means particularly the effect remarkably exhibited in suppressing the lowering of the retention of the tenacity at a high temperature. It is meant that the lower the tenacity at a higher temperature is, the better the effect of improving heat-aging resistance that is possessed by the composition is.

In the polyamide resin composition of the present invention, inorganic compounds or organic compounds, such as lubricants, anti-coloring agents, anti-crosslinking agents, light-resistant agents, pigments, antistatic agents, and fire retardants, can be used additionally in combination.

Further, the polyamide fiber of the present invention can be processed to be used for tire cords, woven fabrics or nonwoven fabrics, such as filter fabric for papermaking and also to be used as short fibers, such as staple fiber and web.

General production conditions of the fiber of the present invention are such that first the resin is melted using a single-screw extruder or a twin-screw extruder and is drawn out through a head nozzle at a head temperature of 245 to 280° C. and the obtained lines are drawn into a water bath or a refrigerant bath having a temperature of 30 to 90° C. whose liquid level is positioned 10 to 110 mm below the head nozzle surface and are stretched continuously without winding them. The stretching is carried out by use of two stages of stretching and one stage of heat setting. As the stretching means, a hot water bath having a temperature of 70 to 90° C., a dry heat air bath having a temperature of 180 to 250° C., and a dry heat air bath having a temperature of 180 to 280° C. are used in the first-stage stretching zone, the second-stage stretching zone, and the heat setting zone, respectively. The stretching conditions are such that the overall draw ratio is from 3.5 to 5.5, the second-stage draw ratio is from 1.2 to 2.0, and the relaxation ratio is from 3 to 15%. At that time, if the relaxation ratio is made large, the loop tenacity of the obtained mono-filament is improved. Further, if a lubricant, such as ethylene-bis-stearylamide, is added, the loop tenacity is also improved. Further, in the polyamide fiber of the polyamide resin composition of the present invention, by mixing the polyamide with other resin, such as a polyester resin, or by making the polyamide fiber have a multi-layer structure, such as a sheath/core structure, the fiber can be used as a fiber remarkably better in heat resistance, hydrolysis resistance, chemical resistance, etc.

Since the polyamide fiber of the present invention has an excellent durability, such as an excellent heat-aging resistance, under conditions having a high temperature, and exhibits a high tenacity and a high Young's modulus, it can be used as a fiber that constitutes a material which requires a heat resistance, a hydrolysis resistance, and a high Young's modulus as in the case of a material for filter fabric for papermaking, industrial woven fabric or nonwoven fabric for industrial filters, and tire cords.

Now, the invention is described based on the Examples. In the Examples, the following methods were used for the evaluation of physical properties.

(1) Measurement of the tenacity and the extension of the fiber

JIS L 1013 "the method of testing chemical fiber filament yarns" was followed.

(2) Heat-aging resistance

After treating the fiber in a 140-° C. oven for a prescribed time, the properties were measured in the same manner as in the above.

In passing, in Tables 1 to 5, nylon MXD6 is labeled as N-MXD6.

EXAMPLE 1

A material prepared by adding, to 100 parts by weight of nylon MXD6 (manufactured by Mitsubishi Gas Chemical Co., Ltd. under the trade name of "6007"), 0.02 part by weight of copper iodide (manufactured by Nippon Kagaku Sangyo Co., Ltd.), 0.4 part by weight of potassium iodide (manufactured by Nippon Kagaku Sangyo Co., Ltd.), 0.5 part by weight of N,N'-hexamethylenebis(3,5-di-t-butyl-4-hydroxy-hydrocinnamamide) (manufactured by Chiba-Geigy (Japan) Ltd. under the trade name of "IRGANOX 1098"), and 0.5 part by weight of bis(2,6-di-t-butyl-4-methylphenyl)pentaerythritol diphosphite (manufactured by Asahi Denka Kogyo K.K. under the trade name of "ADEKA SUTABU PEP-36") was melted using a single-screw extruder and was drawn out through a die nozzle at an extrusion temperature of 245° C. and the obtained lines are drawn into a water bath having a temperature of 30° C. whose liquid level was positioned 50 mm below the head nozzle surface and were stretched continuously without winding them. The stretching was carried out by use of two stages of stretching and one stage of heat setting. As the stretching means, a warm water bath having a temperature of 70° C., a dry heat air bath having a temperature of 210° C., and a dry heat air bath having a temperature of 280° C. were used in the first-stage stretching zone, the second-stage stretching zone, and the heat setting zone, respectively. The stretching conditions were such that the overall draw ratio was from 5.1, the second-stage draw ratio was from 1.5, and the relaxation ratio was from 10%. The production rate was 95 m/min. In this way, a single fiber having a diameter of 0.45 mm was obtained. The performance of the obtained polyamide fiber is shown in Table 1.

EXAMPLE 2

A material obtained by adding, to 100 parts by weight of a polyamide produced by dry blending nylon MXD6 (manufactured by Mitsubishi Gas Chemical Co., Ltd. under the trade name of "6007") with nylon 6 (manufactured by Ube Industries, Ltd. under the trade name of "1011FB") in a weight ratio of 70/30, 0.02 part by weight of copper iodide (manufactured by Nippon Kagaku Sangyo Co., Ltd.), 0.4 part by weight of potassium iodide (manufactured by Nippon Kagaku Sangyo Co., Ltd.), 0.5 part by weight of N,N'-hexamethylenebis(3,5-di-t-butyl-4-hydroxy-hydrocinnamamide) (manufactured by Chiba-Geigy (Japan) Ltd. under the trade name of "IRGANOX 1098"), and 0.5 part by weight of bis(2,6-di-t-butyl-4-methylphenyl)pentaerythritol diphosphite (manufactured by Asahi Denka Kogyo K.K. under the trade name of "ADEKA SUTABU PEP-36") was melted and made into lines and thereafter, from the obtained lines, a single fiber having a diameter of 0.45 mm was obtained in the same method as in Example 1. The performance of the obtained polyamide fiber is shown in Table 1.

EXAMPLE 3

A material obtained by adding, to 100 parts by weight of a polyamide produced by dry blending nylon MXD6 (manufactured by Mitsubishi Gas Chemical Co., Ltd. under the trade name of "6007") with nylon 6 (manufactured by Ube Industries, Ltd. under the trade name of "1011FB") in a weight ratio of 30/70, 0.02 part by weight of copper iodide (manufactured by Nippon Kagaku Sangyo Co., Ltd.), 0.4 part by weight of potassium iodide (manufactured by Nippon Kagaku Sangyo Co., Ltd.), 0.5 part by weight of N,N'-hexamethylenebis (3,5-di-t-butyl-4-hydroxy-hydrocinnamamide) (manufactured by Chiba-Geigy (Japan) Ltd. under the trade name of "IRGANOX 1098"), and 0.5 part by weight of bis(2,6-di-t-butyl-4-methylphenyl)pentaerythritol diphosphite (manufactured by Asahi Denka Kogyo K.K. under the trade name of "ADEKA SUTABU PEP-36") was melted and made into lines and thereafter, from the obtained lines, a single fiber having a diameter of 0.45 mm was obtained in the same method as in Example 1. The performance of the obtained polyamide fiber is shown in Table 1.

EXAMPLE 4

A material obtained by adding, to 100 parts by weight of a polyamide produced by dry blending nylon MXD6 (manufactured by Mitsubishi Gas Chemical Co., Ltd. under the trade name of "6007") with nylon 6 (manufactured by Ube Industries, Ltd. under the trade name of "1011FB") in a weight ratio of 30/70, 0.005 part by weight of copper iodide (manufactured by Nippon Kagaku Sangyo Co., Ltd.), 0.1 part by weight of potassium iodide (manufactured by Nippon Kagaku Sangyo Co., Ltd.), 0.1 part by weight of N,N'-hexamethylenebis(3,5-di-t-butyl-4-hydroxy-hydrocinnamamide) (manufactured by Chiba-Geigy (Japan) Ltd. under the trade name of "Irganox 1098"), and 0.1 part by weight of bis(2,6-di-t-butyl-4-methylphenyl)pentaerythritol diphosphite (manufactured by Asahi Denka Kogyo K.K. under the trade name of "ADEKA SUTABU PEP-36") was melted and made into lines and thereafter, from the obtained lines, a single fiber having a diameter of 0.45 mm was obtained in the same method as in Example 1. The performance of the obtained polyamide fiber is shown in Table 2.

EXAMPLE 5

A material obtained by adding, to 100 parts by weight of a polyamide produced by dry blending nylon MXD6 (manufactured by Mitsubishi Gas Chemical Co., Ltd. under the trade name of "6007") with nylon 6 (manufactured by Ube Industries, Ltd. under the trade name of "1011FB") in a weight ratio of 30/70, 0.02 part by weight of copper iodide (manufactured by Nippon Kagaku Sangyo Co., Ltd.), 0.4 part by weight of potassium iodide (manufactured by Nippon Kagaku Sangyo Co., Ltd.), 0.5 part by weight of 2-(3, 5-di-t-butyl-4-hydroxylbenzyl)-2-n-butylmalonic acid bis(1, 2,6,6-pentamethyl-4-piperizyl) (manufactured by Chiba-Geigy (Japan) Ltd. under the trade name of "TINUVIN 144"), and 0.5 part by weight of bis(2,6-di-t-butyl-4-methylphenyl)pentaerythritol diphosphite (manufactured by Asahi Denka Kogyo K.K. under the trade name of "ADEKA SUTABU PEP-36") was melted and made into lines and thereafter, from the obtained lines, a single fiber having a diameter of 0.45 mm was obtained in the same method as in Example 1. The performance of the obtained polyamide fiber is shown in Table 2.

COMPARATIVE EXAMPLE 1

A material obtained by adding, to 100 parts by weight of a polyamide produced by dry blending nylon MXD6 (manufactured by Mitsubishi Gas Chemical Co., Ltd. under the trade name of "6007") with nylon 6 (manufactured by Ube Industries, Ltd. under the trade name of "1011FB") in a weight ratio of 5/95, 0.02 part by weight of copper iodide (manufactured by Nippon Kagaku Sangyo Co., Ltd.), 0.4 part by weight of potassium iodide (manufactured by Nippon Kagaku Sangyo Co., Ltd.), 0.5 part by weight of N,N'-hexamethylenebis (3,5-di-t-butyl-4-hydroxy-hydrocinnamamide) (manufactured by Chiba-Geigy (Japan) Ltd. under the trade name of "IRGANOX 1098"), and 0.5 part by weight of bis(2,6-di-t-butyl-4-methylphenyl)pentaerythritol diphosphite (manufactured by Asahi Denka Kogyo K.K. under the trade name of "ADEKA SUTABU PEP-36") was melted and made into lines and thereafter, from the obtained lines, a single fiber having a diameter of 0.45 mm was obtained in the same method as in Example 1. The performance of the obtained polyamide fiber is shown in Table 3.

COMPARATIVE EXAMPLE 2

A polyamide produced by dry blending nylon MXD6 (manufactured by Mitsubishi Gas Chemical Co., Ltd. under the trade name of "6007") with nylon 6 (manufactured by Ube Industries, Ltd. under the trade name of "1011FB") in a weight ratio of 30/70 was melted and made into lines and thereafter, from the obtained lines, a single fiber having a diameter of 0.45 mm was obtained in the same method as in Example 1. The performance of the obtained polyamide fiber is shown in Table 3.

COMPARATIVE EXAMPLE 3

A material obtained by adding, to 100 parts by weight of a polyamide produced by dry blending nylon MXD6 (manufactured by Mitsubishi Gas Chemical Co., Ltd. under the trade name of "6007") with nylon 6 (manufactured by Ube Industries, Ltd. under the trade name of "1011FB") in a weight ratio of 30/70, 0.02 part by weight of copper iodide (manufactured by Nippon Kagaku Sangyo Co., Ltd.), and 0.4 part by weight of potassium iodide (manufactured by Nippon Kagaku Sangyo Co., Ltd.) was melted and made into lines and thereafter, from the obtained lines, a single fiber having a diameter of 0.45 mm was obtained in the same method as in Example 1. The performance of the obtained polyamide fiber is shown in Table 3.

COMPARATIVE EXAMPLE 4

A material obtained by adding, to 100 parts by weight of a polyamide produced by dry blending nylon MXD6 (manufactured by Mitsubishi Gas Chemical Co., Ltd. under the trade name of "6007") with nylon 6 (manufactured by Ube Industries, Ltd. under the trade name of "1011FB") in a weight ratio of 30/70, 0.5 part by weight of N,N'-hexamethylenebis (3,5-di-t-butyl-4-hydroxy-hydrocinnamamide) (manufactured by Chiba-Geigy (Japan) Ltd. under the trade name of "IRGANOX 1098"), and 0.5 part by weight of bis(2,6-di-t-butyl-4-methylphenyl) pentaerythritol diphosphite (manufactured by Asahi Denka Kogyo K.K. under the trade name of "ADEKA SUTABU PEP-36") was melted and made into lines and thereafter, from the obtained lines, a single fiber having a diameter of 0.45 mm was obtained in the same method as in Example 1. The performance of the obtained polyamide fiber is shown in Table 4.

COMPARATIVE EXAMPLE 5

A material obtained by adding, to 100 parts by weight of a polyamide produced by dry blending nylon MXD6 (manufactured by Mitsubishi Gas Chemical Co., Ltd. under the trade name of "6007") with nylon 6 (manufactured by Ube Industries, Ltd. under the trade name of "1011FB") in a weight ratio of 30/70, 0.4 part by weight of potassium iodide (manufactured by Nippon Kagaku Sangyo Co., Ltd.), 0.5 part by weight of N,N'-hexamethylenebis(3, 5-di-t-butyl-4-hydroxy-hydrocinnamamide) (manufactured by Chiba-Geigy (Japan) Ltd. under the trade name of "IRGANOX 1098"), and 0.5 part by weight of bis(2,6-di-t-butyl-4-methylphenyl)pentaerythritol diphosphite (manufactured by Asahi Denka Kogyo K.K. under the trade name of "ADEKA SUTABU PEP-36") was melted and made into lines and thereafter, from the obtained lines, a single fiber having a diameter of 0.45 mm was obtained in the same method as in Example 1. The performance of the obtained polyamide fiber is shown in Table 4.

COMPARATIVE EXAMPLE 6

A material obtained by adding, to 100 parts by weight of a polyamide produced by dry blending nylon MXD6 (manufactured by Mitsubishi Gas Chemical Co., Ltd. under the trade name of "6007") with nylon 6 (manufactured by Ube Industries, Ltd. under the trade name of "1011FB") in a weight ratio of 30/70, 0.02 part by weight of copper iodide (manufactured by Nippon Kagaku Sangyo Co., Ltd.), 0.5 part by weight of N,N'-hexamethylenebis(3,5-di-t-butyl-4-hydroxy-hydrocinnamamide) (manufactured by Chiba-Geigy (Japan) Ltd. under the trade name of "IRGANOX 1098"), and 0.5 part by weight of bis(2,6-di-t-butyl-4-methylphenyl)pentaerythritol diphosphite (manufactured by Asahi Denka Kogyo K.K. under the trade name of "ADEKA SUTABU PEP-36") was melted and made into lines and thereafter, from the obtained lines, a single fiber having a diameter of 0.45 mm was obtained in the same method as in Example 1. The performance of the obtained polyamide fiber is shown in Table 4.

COMPARATIVE EXAMPLE 7

A material obtained by adding, to 100 parts by weight of a polyamide produced by dry blending nylon MXD6 (manufactured by Mitsubishi Gas Chemical Co., Ltd. under the trade name of "6007") with nylon 6 (manufactured by Ube Industries, Ltd. under the trade name of "1011FB") in a weight ratio of 30/70, 0.02 part by weight of copper iodide (manufactured by Nippon Kagaku Sangyo Co., Ltd.), 0.4 part by weight of potassium iodide (manufactured by Nippon Kagaku Sangyo Co., Ltd.), and 5000 ppm of bis(2, 6-di-t-butyl-4-methylphenyl)pentaerythritol diphosphite (manufactured by Asahi Denka Kogyo K.K. under the trade name of "ADEKA SUTABU PEP-36") was melted and made into lines and thereafter, from the obtained lines, a single fiber having a diameter of 0.45 mm was obtained in the same method as in Example 1. The performance of the obtained polyamide fiber is shown in Table 5.

COMPARATIVE EXAMPLE 8

A material obtained by adding, to 100 parts by weight of a polyamide produced by dry blending nylon MXD6 (manufactured by Mitsubishi Gas Chemical Co., Ltd. under the trade name of "6007") with nylon 6 (manufactured by Ube Industries, Ltd. under the trade name of "1011FB") in a weight ratio of 30/70, 0.02 part by weight of copper iodide (manufactured by Nippon Kagaku Sangyo Co., Ltd.), 0.4 part by weight of potassium iodide (manufactured by Nippon Kagaku Sangyo Co., Ltd.), and 0.5 part by weight of N,N'-hexamethylenebis (3,5-di-t-butyl-4-hydroxy-hydrocinnamamide) (manufactured by Chiba-Geigy (Japan) Ltd. under the trade name of "IRGANOX 1098") was melted and made into lines and thereafter, from the obtained lines, a single fiber having a diameter of 0.45 mm was obtained in the same method as in Example 1. The performance of the obtained polyamide fiber is shown in Table 5.

COMPARATIVE EXAMPLE 9

A material obtained by adding, to 100 parts by weight of a polyamide produced by dry blending nylon MXD6 (manufactured by Mitsubishi Gas Chemical Co., Ltd. under the trade name of "6007") with nylon 6 (manufactured by Ube Industries, Ltd. under the trade name of "1011FB") in a weight ratio of 30/70, 0.02 part by weight of copper iodide (manufactured by Nippon Kagaku Sangyo Co., Ltd.), 0.4 part by weight of potassium iodide (manufactured by Nippon Kagaku Sangyo Co., Ltd.), and 0.5 part by weight of 2-(3,5-di-t-butyl-4-hydroxylbenzyl)-2-n-butylmalonic acid bis(1, 2,6,6-pentamethyl-4-piperizyl) (manufactured by Chiba-Geigy (Japan) Ltd. under the trade name of "TINUVIN 144") was melted and made into lines and thereafter, from the obtained lines, a single fiber having a diameter of 0.45 mm was obtained in the same method as in Example 1. The performance of the obtained polyamide fiber is shown in Table 5.

TABLE 1

|  | Ex. 1 | Ex. 2 | Ex. 3 |
|---|---|---|---|
| (1) Polymer composition |  |  |  |
| Polyamide (A) | N-MXD6 | N-MXD6 | N-MXD6 |
| Polyamide (B) | — | nylon 6 | nylon 6 |
| Blending ratio (A)/(B) | 100/0 | 70/30 | 30/70 |
| Additive |  |  |  |
| Copper compound | CuI | ← | ← |
| Conc. (pts. wt.) | 0.02 | ← | ← |
| Halide | KI | ← | ← |
| Conc. (pts. wt.) | 0.4 | ← | ← |
| Antioxidant |  |  |  |
| Phenolic/amine type | Irganox 1098 | ← | ← |
| Conc. (pts. wt.) | 0.5 | ← | ← |
| Phosphoric | PEP-36 | ← | ← |
| Conc. (pts. wt.) | 0.5 | ← | ← |
| (2) Shape of polyamide fiber |  |  |  |
| Thickness (mm) | 0.45 | 0.45 | 0.45 |
| Denier (D) | 1800 | 1800 | 1700 |
| Draw ratio | 5.1 | 5.1 | 5.1 |
| (3) Tenacity |  |  |  |
| Before treatment (g/D) | 7.4 | 6.6 | 6.2 |
| After 3 days of treatment |  |  |  |
| at 140° C. (g/D) | 7.1 | 6.3 | 6.2 |
| Retention (%) | 96 | 95 | 100 |
| After 7 days of treatment |  |  |  |
| at 140° C. (g/D) | 5.2 | 5.9 | 6.2 |
| Retention (%) | 71 | 89 | 100 |
| After 21 days of treatment |  |  |  |
| at 140° C. (g/D) | 4.8 | 4.6 | 6.2 |
| Retention (%) | 65 | 70 | 100 |
| (4) Young's modulus (kgf/mm$^2$) | 770 | 690 | 540 |

TABLE 2

|  | Ex. 4 | Ex. 5 |
|---|---|---|
| (1) Polymer composition |  |  |
| Polyamide (A) | N-MXD6 | N-MXD6 |
| Polyamide (B) | nylon 6 | nylon 6 |
| Blending ratio (A)/(B) | 30/70 | 30/70 |
| Additive |  |  |
| Copper compound | CuI | CuI |
| Conc. (pts. wt.) | 0.005 | 0.02 |
| Halide | KI | KI |
| Conc. (pts. wt.) | 0.1 | 0.4 |
| Antioxidant |  |  |
| Phenolic/amine type | Irganox 1098 | TINUVIN 144 |
| Conc. (pts. wt.) | 0.1 | 0.5 |
| Phosphoric | PEP-36 | PEP-36 |
| Conc. (pts. wt.) | 0.1 | 0.5 |
| (2) Shape of polyamide fiber |  |  |
| Thickness (mm) | 0.45 | 0.45 |
| Denier (D) | 1700 | 1700 |
| Draw ratio | 5.1 | 5.1 |
| (3) Tenacity |  |  |
| Before treatment (g/D) | 6.2 | 6.1 |
| After 3 days of treatment |  |  |
| at 140° C. (g/D) | 5.6 | 5.3 |
| Retention (%) | 90 | 86 |

TABLE 2-continued

|  | Ex. 4 | Ex. 5 |
| --- | --- | --- |
| After 7 days of treatment | | |
| at 140° C. (g/D) | 5.0 | 4.8 |
| Retention (%) | 80 | 79 |
| After 21 days of treatment | | |
| at 140° C. (g/D) | 4.7 | 4.7 |
| Retention (%) | 75 | 75 |
| (4) Young's modulus (kgf/mm$^2$) | 540 | 540 |

TABLE 3

|  | Comp. Ex. 1 | Comp. Ex. 2 | Comp. Ex. 3 |
| --- | --- | --- | --- |
| (1) Polymer composition | | | |
| Polyamide (A) | N-MXD6 | N-MXD6 | N-MXD6 |
| Polyamide (B) | nylon 6 | nylon 6 | nylon 6 |
| Blending ratio (A)/(B) | 5/95 | 30/70 | 30/70 |
| Additive | | | |
| Copper compound | CuI | — | CuI |
| Conc. (pts. wt.) | 0.02 | — | 0.02 |
| Halide | KI | — | KI |
| Conc. (pts. wt.) | 0.4 | — | 0.4 |
| Antioxidant | | | |
| Phenolic/amine type | Irganox 1098 | — | — |
| Conc. (pts. wt.) | 0.5 | — | — |
| Phosphoric | PEP-36 | — | — |
| Conc. (pts. wt.) | 0.5 | — | — |
| (2) Shape of polyamide fiber | | | |
| Thickness (mm) | 0.45 | 0.45 | 0.45 |
| Denier (D) | 1600 | 1700 | 1700 |
| Draw ratio | 5.1 | 5.1 | 5.1 |
| (3) Tenacity | | | |
| Before treatment (g/D) | 6.0 | 6.2 | 6.3 |
| After 3 days of treatment | | | |
| at 140° C. (g/D) | 6.0 | 1.9 | 3.2 |
| Retention (%) | 100 | 31 | 51 |
| After 7 days of treatment | | | |
| at 140° C. (g/D) | 6.0 | 0.5 | 1.2 |
| Retention (%) | 100 | 8 | 19 |
| After 21 days of treatment | | | |
| at 140° C. (g/D) | 6.0 | 0 | 0.5 |
| Retention (%) | 100 | 0 | 0.8 |
| (4) Young's modulus (kgf/mm$^2$) | 310 | 530 | 540 |

TABLE 4

|  | Comp. Ex. 4 | Comp. Ex. 5 | Comp. Ex. 6 |
| --- | --- | --- | --- |
| (1) Polymer composition | | | |
| Polyamide (A) | N-MXD6 | N-MXD6 | N-MXD6 |
| Polyamide (B) | nylon 6 | nylon 6 | nylon 6 |
| Blending ratio (A)/(B) | 30/70 | 70/30 | 30/70 |
| Additive | | | |
| Copper compound | — | — | CuI |
| Conc. (pts. wt.) | — | — | 0.02 |
| Halide | — | KI | — |
| Conc. (pts. wt.) | — | 0.4 | — |
| Antioxidant | | | |
| Phenolic/amine type | Irganox 1098 | ← | ← |
| Conc. (pts. wt.) | 0.5 | ← | ← |
| Phosphoric | PEP-36 | ← | ← |
| Conc. (pts. wt.) | 0.5 | ← | ← |
| (2) Shape of polyamide fiber | | | |
| Thickness (mm) | 0.45 | 0.45 | 0.45 |
| Denier (D) | 1600 | 1700 | 1700 |
| Draw ratio | 5.1 | 5.1 | 5.1 |
| (3) Tenacity | | | |
| Before treatment (g/D) | 6.2 | 6.3 | 6.2 |
| After 3 days of treatment | | | |
| at 140° C. (g/D) | 4.3 | 5.0 | 5.1 |
| Retention (%) | 69 | 79 | 83 |
| After 7 days of treatment | | | |
| at 140° C. (g/D) | 3.1 | 3.6 | 4.3 |
| Retention (%) | 50 | 57 | 69 |
| After 21 days of treatment | | | |
| at 140° C. (g/D) | 2.6 | 2.2 | 2.5 |
| Retention (%) | 42 | 35 | 40 |
| (4) Young's modulus (kgf/mm$^2$) | 540 | 550 | 540 |

TABLE 5

|  | Comp. Ex. 7 | Comp. Ex. 8 | Comp. Ex. 9 |
| --- | --- | --- | --- |
| (1) Polymer composition | | | |
| Polyamide (A) | N-MXD6 | N-MXD6 | N-MED6 |
| Polyamide (B) | nylon 6 | nylon 6 | nylon 6 |
| Blending ratio (A)/(B) | 30/70 | 30/70 | 30/70 |
| Additive | | | |
| Copper compound | CuI | ← | ← |
| Conc. (pts. wt.) | 0.02 | ← | ← |
| Halide | KI | ← | ← |
| Conc. (pts. wt.) | 0.4 | ← | ← |
| Antioxidant | | | |
| Phenolic/amine type | — | Irganox 1098 | TINUVIN 144 |
| Conc. (pts. wt.) | — | 0.5 | 0.5 |
| Phosphoric | PEP-36 | — | — |
| Conc. (pts. wt.) | 0.5 | — | — |
| (2) Shape of polyamide fiber | | | |
| Thickness (mm) | 0.45 | 0.45 | 0.45 |
| Denier (D) | 1700 | 1700 | 1700 |
| Draw ratio | 5.1 | 5.1 | 5.1 |
| (3) Tenacity | | | |
| Before treatment (g/D) | 6.3 | 6.2 | 6.2 |
| After 3 days of treatment | | | |
| at 140° C. (g/D) | 5.4 | 5.5 | 5.4 |
| Retention (%) | 85 | 89 | 87 |
| After 7 days of treatment | | | |
| at 140° C. (g/D) | 4.4 | 4.0 | 3.2 |
| Retention (%) | 70 | 65 | 52 |
| After 21 days of treatment | | | |
| at 140° C. (g/D) | 2.8 | 2.9 | 1.9 |

TABLE 5-continued

| | Comp. Ex. 7 | Comp. Ex. 8 | Comp. Ex. 9 |
|---|---|---|---|
| Retention (%) | 45 | 47 | 31 |
| (4) Young's modulus (kgf/mm$^2$) | 550 | 540 | 530 |

What is claimed is:

1. A heat-aging-resistant polyamide fiber, comprising a polyamide resin composition comprising:
    (C) a polyamide containing 10 to 100% by weight of (A) a polyamide obtained by polymerizing (i) a diamine monomer comprising 70 mole % or more of m-xylylenediamine and (ii) a dicarboxylic acid monomer comprising 70 mole % or more of adipic acid, and 90 to 0% by weight of (B) a polyamide other than polyamide (A),
    (D) a copper compound in an amount of 0.001 to 0.1 part by weight per 100 parts by weight of the polyamide (C),
    (E) a halide of a Group 1 or Group 2 metal of the Periodic Table of the Elements, an ammonium halide, or an organohalide, said halide being in an amount of 0.005 to 1 part by weight per 100 parts by weight of the polyamide (C),
    at least one compound selected from the group consisting of (F) a hindered phenol and (G) a hindered amine, the amount of each of the hindered phenol (F) and the hindered amine (G) being 0.05 to 3 parts by weight per 100 parts by weight of the polyamide (C), and
    (H) an organophosphorus compound in an amount of 0.05 to 3 parts by weight per 100 parts by weight of the polyamide (C).

2. The heat-aging-resistant polyamide fiber as claimed in claim 1, wherein said copper compound (D) comprises at least one compound selected from the group consisting of copper chloride, copper bromide, copper iodide, copper phosphate and copper stearate.

3. The heat-aging-resistant polyamide fiber as claimed in claim 1, wherein said halide (E) comprises at least one compound selected from the group consisting of sodium bromide, sodium iodide, potassium bromide, potassium iodide, calcium chloride, ammonium iodide, stearyltriethylammonium bromide and benzyltriethylammonium iodide.

4. The heat-aging-resistant polyamide fiber as claimed in claim 1, wherein the polyamide resin composition includes said hindered phenol (F), said hindered phenol comprising at least one compound selected from the group consisting of pentaerythrityl-tetrakis(3-(3,5-di-t-butyl-4-hydroxyphenyl) propionate); N,N'-hexamethylenebis(3,5-di-t-butyl-4-hydroxy-hydrocinnamide) and 3,5-d-t-butyl-4-hydroxy-benzylphosphonate diethyl ester.

5. The heat-aging-resistant polyamide fiber as claimed in claim 1, wherein the polyamide resin composition includes said hindered amine (G), said hindered amine comprising at least one compound selected from the group consisting of bis(2,2,6,6-tetramethyl-4-piperidyl) sebacate, bis(1,2,2,6,6-pentaethyl-4-piperidinyl) sebacate and 2-(3,5-di-t-butyl-4-hydroxybenzyl)-2-n-butyl malonate bis(1,2,2,6,6-pentamethyl-4-piperidyl).

6. The heat-aging-resistant polyamide fiber as claimed in claim 1, wherein said organophosphorus compound (H) comprises at least one compound selected from the group consisting of bis(2,6-di-t-butyl-4-methylphenyl) pentaerythritol diphosphite, bis(2,4-di-t-butylphenyl) pentaerythritol diphosphite, bis(octadecyl)pentaerythritol diphosphite and bis(nonylphenyl)pentaerythritol diphosphite.

7. The heat-aging-resistant polyamide fiber as claimed in claim 1, wherein the fiber has a Young's modulus of 400 kgf/mm$^2$ or more.

8. The heat-aging-resistant polyamide fiber as claimed in claim 2, wherein the fiber has a Young's modulus of 400 kgf/mm$^2$ or more.

9. The heat-aging-resistant polyamide fiber as claimed in claim 3, wherein the fiber has a Young's modulus of 400 kgf/mm$^2$ or more.

10. The heat-aging-resistant polyamide fiber as claimed in claim 4, wherein the fiber has a Young's modulus of 400 kgf/mm$^2$ or more.

11. The heat-aging-resistant polyamide fiber as claimed in claim 5, wherein the fiber has a Young's modulus of 400 kgf/mm$^2$ or more.

12. The heat-aging-resistant polyamide fiber as claimed in claim 6, wherein the fiber has a Young's modulus of 400 kgf/mm$^2$ or more.

* * * * *